US010920992B2

(12) United States Patent
Kobayashi et al.

(10) Patent No.: US 10,920,992 B2
(45) Date of Patent: Feb. 16, 2021

(54) COOKER

(71) Applicants: Mitsubishi Electric Corporation, Tokyo (JP); Mitsubishi Electric Home Appliance Co., Ltd., Fukaya (JP)

(72) Inventors: Akihiko Kobayashi, Tokyo (JP); Hayato Yoshino, Tokyo (JP)

(73) Assignees: Mitsubishi Electric Corporation, Tokyo (JP); Mitsubishi Electric Home Appliance Co., Ltd., Fukaya (JP)

( * ) Notice: Subject to any disclaimer, the term of this patent is extended or adjusted under 35 U.S.C. 154(b) by 131 days.

(21) Appl. No.: 16/099,226

(22) PCT Filed: Nov. 17, 2016

(86) PCT No.: PCT/JP2016/084026
§ 371 (c)(1),
(2) Date: Nov. 6, 2018

(87) PCT Pub. No.: WO2018/020698
PCT Pub. Date: Feb. 1, 2018

(65) Prior Publication Data
US 2020/0018490 A1    Jan. 16, 2020

(30) Foreign Application Priority Data
Jul. 29, 2016   (JP) .............................. JP2016-149831

(51) Int. Cl.
*F24C 15/18*    (2006.01)
*A47B 77/08*    (2006.01)
*A47J 27/12*    (2006.01)
*F24C 15/20*    (2006.01)
*F24C 15/34*    (2006.01)
*H05B 6/12*    (2006.01)

(52) U.S. Cl.
CPC .............. *F24C 15/18* (2013.01); *A47B 77/08* (2013.01); *A47J 27/12* (2013.01);
(Continued)

(58) Field of Classification Search
CPC .......... F24C 15/34; F24C 15/20; F24C 15/18; A47B 77/08; A47J 27/12
See application file for complete search history.

(56) References Cited

U.S. PATENT DOCUMENTS 8,916,801 B2 * 12/2014 Harward ................ H05B 3/746
219/385
8,919,243 B2 * 12/2014 Kang .................. F24C 15/2042
99/425

(Continued)

FOREIGN PATENT DOCUMENTS

JP       2550216 Y2    10/1997
JP    H11-276354 A    10/1999

(Continued)

OTHER PUBLICATIONS

International Search Report of the International Searching Authority dated Feb. 21, 2017 for the corresponding International application No. PCT/JP2016/084026 (and English translation).

*Primary Examiner* — David J Laux
*Assistant Examiner* — Nikhil P Mashruwala
(74) *Attorney, Agent, or Firm* — Posz Law Group, PLC

(57) ABSTRACT

A cooker includes a heating coil, a housing accommodating the heating coil, a top plate provided on the housing, a partition defining a storage in the housing and below the heating coil and including a first partition extending parallel to the top plate and a second partition extending perpendicularly to the first partition, a first facing wall facing the first partition with a gap defined between the first facing wall and the first partition, a second facing wall facing the second partition with a gap defined between the second facing wall and the second partition, a heat-insulating layer provided between the first partition and the first facing wall, and a heat-insulating layer provided between the second partition and the second facing wall, the heat-insulating layers being (Continued)

each made of a substance having a lower thermal conductivity than one of the first facing wall and the second facing wall.

14 Claims, 12 Drawing Sheets

(52) U.S. Cl.
CPC .......... *F24C 15/2042* (2013.01); *F24C 15/34* (2013.01); *H05B 6/12* (2013.01)

(56) References Cited

U.S. PATENT DOCUMENTS

| | | | | |
|---|---|---|---|---|
| 9,012,815 B2* | 4/2015 | Cha | ..................... | F24C 15/18 |
| | | | | 219/394 |
| 10,206,537 B1* | 2/2019 | Ebbes | ................. | A47J 37/0713 |
| 2011/0303651 A1* | 12/2011 | Mineoka | ................ | F24C 15/327 |
| | | | | 219/432 |
| 2014/0352551 A1* | 12/2014 | Ducate | ................ | A47J 37/0713 |
| | | | | 99/339 |
| 2016/0195281 A1* | 7/2016 | Chaturvedi | ............. | F24C 15/16 |
| | | | | 219/393 |
| 2016/0334114 A1* | 11/2016 | Choi | ........................ | F24C 15/34 |
| 2019/0141795 A1* | 5/2019 | Roux | ..................... | A47B 77/08 |
| 2019/0174920 A1* | 6/2019 | Kobayashi | ........... | A47B 88/453 |
| 2020/0182482 A1* | 6/2020 | Penuel | .................. | F24C 15/322 |

FOREIGN PATENT DOCUMENTS

| | | |
|---|---|---|
| JP | 2006-280441 A | 10/2006 |
| JP | 2012-007850 A | 1/2012 |
| JP | 2013-246921 A | 12/2013 |
| JP | 2014-074561 A | 4/2014 |

* cited by examiner

COOKER

CROSS REFERENCE TO RELATED APPLICATION

This application is a U.S. national stage application of International Application No. PCT/JP2016/084026, filed on Nov. 17, 2016, which claims priority to Japanese Patent Application No. 2016-149831, filed on Jul. 29, 2016, the contents of which are incorporated herein by reference.

TECHNICAL FIELD

The present invention relates to a cooker including a heating coil and a storage that are provided in a housing of the cooker, the housing being accommodated in an accommodating portion provided in a kitchen furniture item.

BACKGROUND

There have been built-in-type cookers that are each installed by accommodating a housing of a cooker into a kitchen furniture item from a top opening provided at an upper surface of the kitchen furniture item, with a top board at the top of the housing of the cooker being exposed on the upper surface of the kitchen furniture item. As an example of such a cooker, there is a proposal of a cooker that includes an article storage provided in a housing of the cooker (see Patent Literature 1, for example).

PATENT LITERATURE

Patent Literature 1: Japanese Unexamined Patent Application Publication No. 11-276354 (page 6)

In the cooker disclosed in Patent Literature 1, pieces of stuff such as cookware, tableware, and seasonings can be stored in the storage provided in the housing. However, the cooker includes heat-generating components, such as heating coils and inverter devices that drive the heating coils, provided in the housing of the cooker. For this reason, heat generated by the heat-generating components may raise the temperature inside the storage, and the pieces of stuff in the storage may be deteriorated. As another problem, when the temperature inside the storage is high, the heat inside the storage is transmitted to the user when the user opens the door of the storage, which gives an odd feeling and an uncomfortable feeling to the user because of heat shock.

SUMMARY

The present invention has been conceived in view of the above problems and provides a cooker in which the rise of the temperature in a storage provided in a housing of the cooker can be reduced.

A cooker according to an embodiment of the present invention includes a heating coil, a housing accommodating the heating coil, a top plate provided on the housing, a partition defining a storage in the housing and below the heating coil and including a first partition extending parallel to the top plate and a second partition extending perpendicularly to the first partition, a first facing wall facing the first partition with a gap defined between the first facing wall and the first partition, a second facing wall facing the second partition with a gap defined between the second facing wall and the second partition, a heat-insulating layer provided between the first partition and the first facing wall, and a heat-insulating layer provided between the second partition and the second facing wall. The heat-insulating layers are each made of a substance having a lower thermal conductivity than a thermal conductivity of a corresponding one of the first facing wall and the second facing wall.

According to an embodiment of the present invention, as the heat conduction to the partition that defines the storage is reduced by the heat-insulating layers, the rise of the temperature in the storage can be reduced.

DETAILED DESCRIPTION

Figure 1:
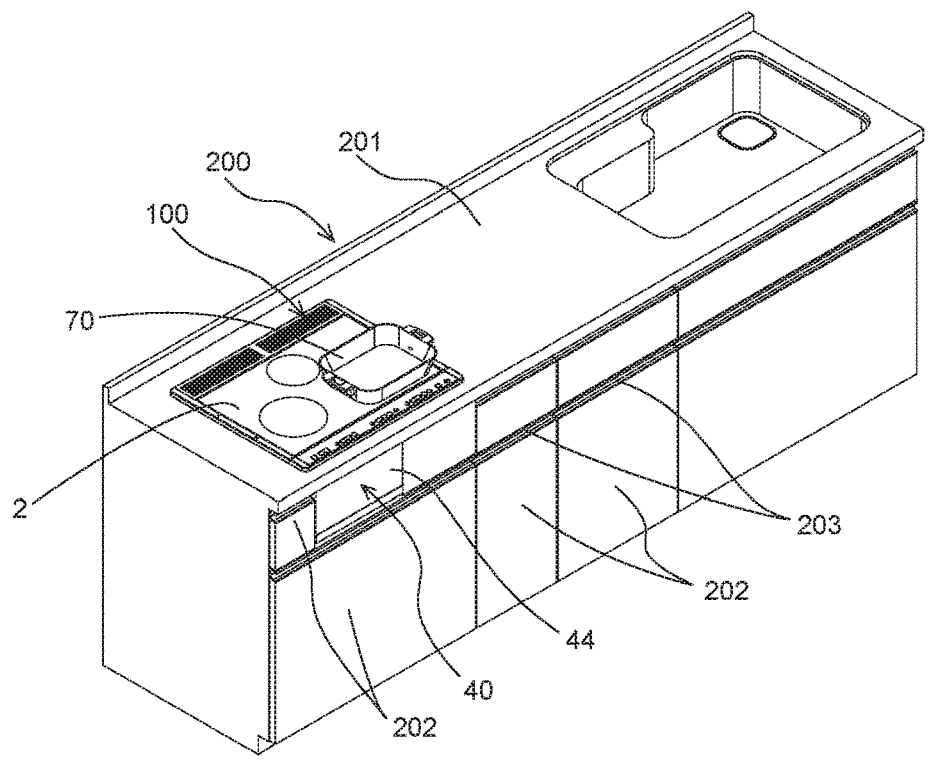
FIG. 1 is a perspective view of a kitchen furniture item equipped with a cooker according to Embodiment 1.

Embodiments of the cooker according to the present invention will be described below with reference to the drawings. The present invention is not limited to the following embodiments illustrated in the drawings. In the following description, terms (such as "top", "bottom", "right", "left", "front", and "rear") representing directions and used appropriately for easy understanding are only explanatory, and the present invention is not limited to the directions represented by the terms. In the drawings, the same reference signs denote the same or similar elements, and the reference signs are common throughout this specification. The relative sizes, the shapes, and other details of the elements illustrated in the drawings may be different from the actual ones.

Embodiment 1

FIG. 1 is a perspective view of a kitchen furniture item equipped with a cooker according to Embodiment 1. As illustrated in FIG. 1, a kitchen furniture item 200 includes a cooker 100 built in the kitchen furniture item 200. The kitchen furniture item 200 has a flat top board 201 used as a worktable. A top plate 2 of the cooker 100 is exposed on the top board 201. For the convenience of description, FIG. 1 also illustrates a cooking pan 70 to be heated on the top plate 2. The kitchen furniture item 200 includes, in the kitchen furniture item 200, a plurality of storage spaces, which are not illustrated. Front boards 202 serving as doors that open and close the respective storage spaces are provided on the front face of the kitchen furniture item 200. The front boards 202 have respective handholds 203 used as grips for opening and closing the front boards 202. When the user pulls any of the handholds 203, one of the front boards 202 that is provided with that handhold 203 opens. The front boards 202 are each a plate-like part whose front surface is flat. The front boards 202 may be each allowed to be slid in the depth direction or may be each allowed to be opened and closed about a hinge provided on a lateral portion, the lower portion, or the upper portion of the front board 202. In this specification, the "front face" of the cooker 100 or the "front face" of the kitchen furniture item 200 refers to a face of the cooker 100 or the kitchen furniture item 200 that faces the user.

The cooker 100 has, on the front face of the cooker 100, a drawer door 44 of a drawer unit 40 stored in a storage 8 (see FIG. 3) provided in the cooker 100. The drawer unit 40 is exposed on the front face of the cooker 100.

Figure 2:
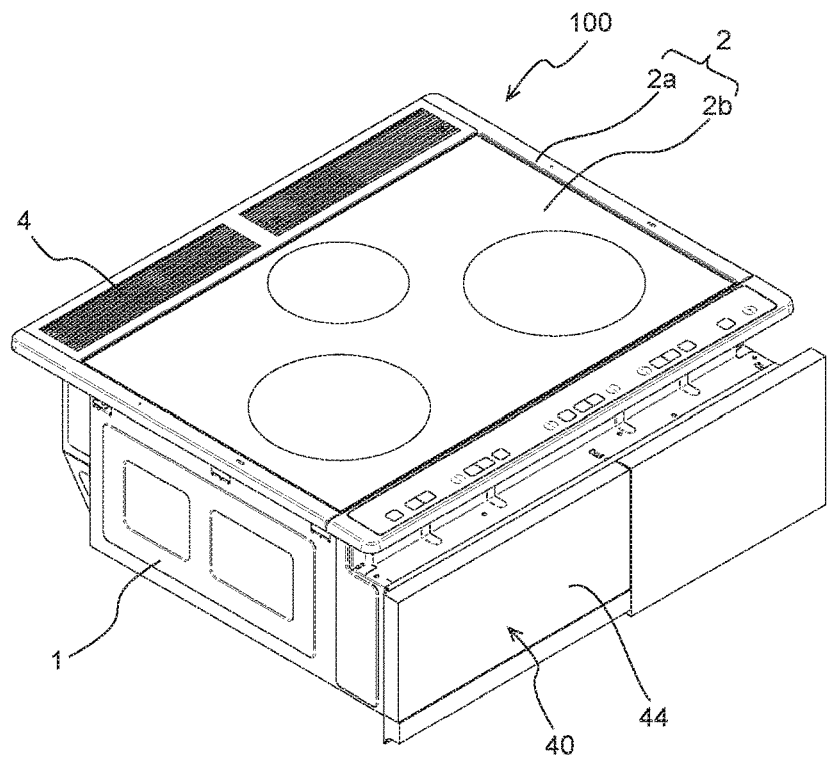
FIG. 2 is a perspective view of the cooker according to Embodiment 1.

FIG. 2 is a perspective view of the cooker according to Embodiment 1. The cooker 100 includes a housing 1 made of metal and in which components are accommodated. The housing 1 is provided, at the top of the housing 1, with the top plate 2 on which a cooking pan that is a heating object is to be placed. The top plate 2 is formed as a combination of a metal frame 2a and a plate 2b provided inside the metal frame 2a. The plate 2b is made of a nonmetallic material such as heat-resisting glass and ceramic. The plate 2b of the top plate 2 has, on the front or the rear of the plate 2b, indications that are marks representing cooking zones on any of which the heating object is to be placed. Hereinafter, the frame 2a and the plate 2b are not distinguished from each other and are generically referred to as the top plate 2.

The top plate 2 is provided with an exhaust-vent cover 4 at the rear portion of the top plate 2. The exhaust-vent cover 4 has openings that allow air to flow through the exhaust-vent cover 4. Consequently, exhaust air can smoothly flow through the exhaust-vent cover 4. Providing the exhaust-vent cover 4 reduces the entry of foreign substances into an exhaust vent 3 (see FIG. 3) provided below the exhaust-vent cover 4.

Figure 3:
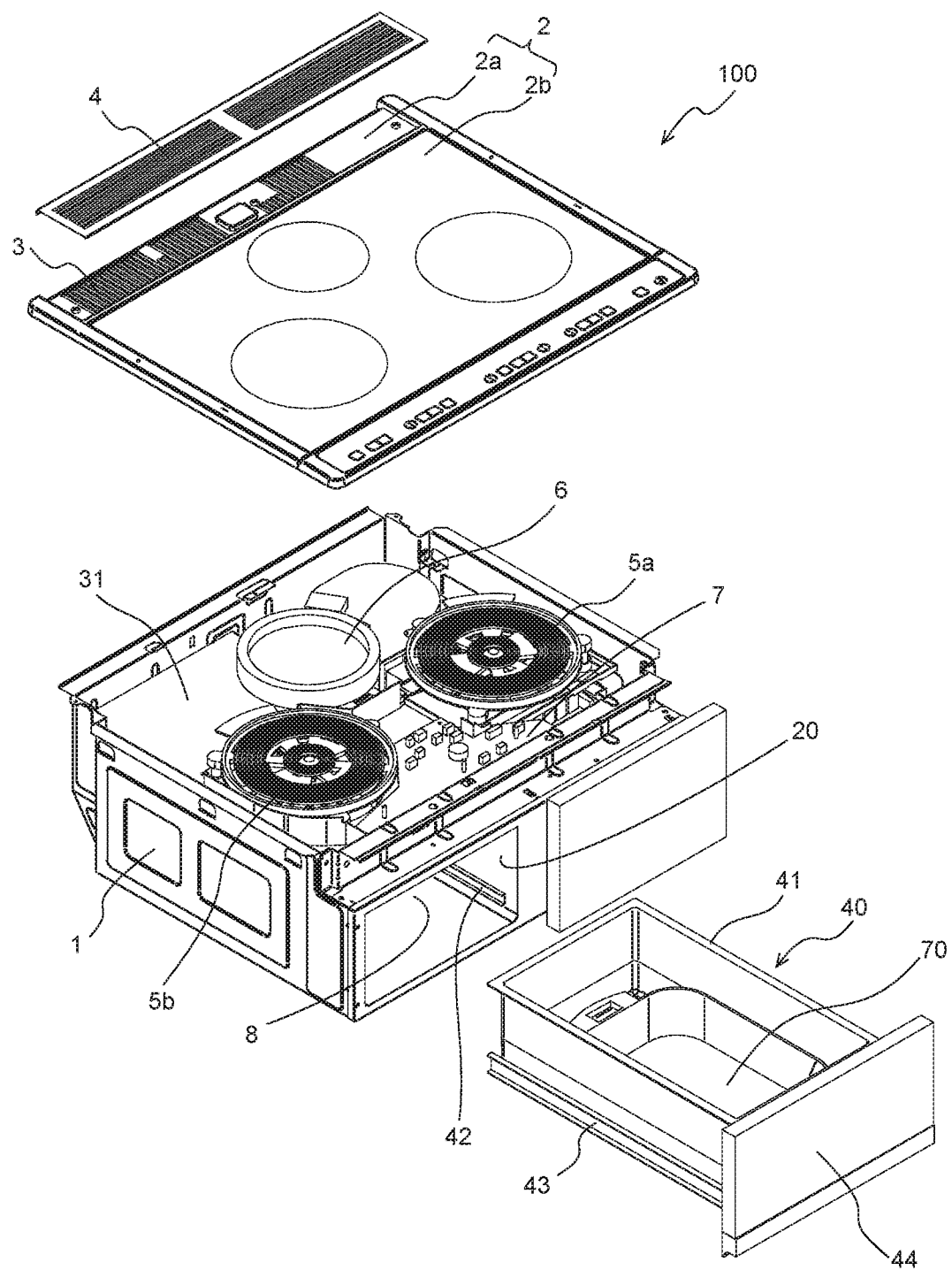
FIG. 3 is an exploded perspective view of the cooker according to Embodiment 1.

FIG. 3 is an exploded perspective view of the cooker according to Embodiment 1. The frame 2a of the top plate 2 has the exhaust vent 3, which is an opening vertically passing through the frame 2a. The exhaust vent 3 according to Embodiment 1 includes a plurality of slit-type openings. In a state where the top plate 2 is attached to the top of the housing 1, the inside and the outside of the housing 1 communicate with each other through the exhaust vent 3. The exhaust vent 3 only needs to be an opening allowing the inside and the outside of the housing 1 to communicate with each other and may alternatively be provided in, for example, the housing 1.

The housing 1 of the cooker 100 is made of metal plate and has a substantially box-like shape with the top face of the housing 1 open. The housing 1 of the cooker 100 accommodates two heating coils 5a and 5b and a radiant heater 6 that are heaters that each heat the heating object to be placed on the top plate 2. The number and arrangement of the heating coils 5a and 5b and the radiant heater 6 illustrated in the drawing are only exemplary. At least one heating coil only needs to be provided in the housing 1.

The housing 1 accommodates a circuit board 7 on which an inverter that supplies a high-frequency current to the heating coil 5a and the heating coil 5b, a drive circuit that drives the radiant heater 6, and a control circuit are mounted. The control circuit of the cooker 100 controls the heaters in accordance with inputs made by the user, thereby heating the heating object placed on the top plate 2. The cooker 100 may have a cooking menu for controlling the heating operation in accordance with predetermined control sequences.

The housing 1 has the storage 8 defined in a substantially cuboid shape. Walls that define the storage 8 are generically referred to as a partition 20. The storage 8 has an open part at the front face of the storage 8. The drawer unit 40 is stored in the storage 8 through the open part in such a manner that the drawer unit 40 is allowed to be pulled outward and pushed inward of the storage 8.

The drawer unit 40 includes a box-like case 41 whose top face is open, movable rails 43 each extending in a direction from the front to the rear of the cooker 100, and the drawer door 44 connected to the case 41 and the movable rails 43. The partition 20 of the storage 8 is provided with fixed rails 42 that are each on a corresponding one of the left and right inner surfaces of the partition 20 and each extend in the direction from the front to the rear of the cooker 100 as with the movable rails 43. The movable rails 43 are in engagement with the respective fixed rails 42 in such a manner as to be allowed to be slid back and forth. The drawer unit 40 is held in the storage 8 with the aid of the fixed rails 42 and the movable rails 43 in such a manner that the drawer unit 40 is allowed to be detached from the storage 8. For example, not only the cooking pan 70 to be used in the heating with the cooker 100 but also seasonings and other pieces of stuff are likely to be stored in the drawer unit 40. For this reason, the case 41 is required to be clean. Meanwhile, areas around the cooker 100 tend to become dirty with some food stuff, oil soot, steam, and other similar matter scattered during cooking. When the drawer unit 40 is allowed to be detached from the storage 8 as in Embodiment 1, the user can easily clean the drawer unit 40. When the cooker 100 has the cooking menu mentioned above, the capacity of the case 41 may be determined in such a manner that a cooking pan to be used for the cooking menu can be stored in the case 41. When the case 41 is designed to store such a dedicated cooking pan, the ease of work in cooking can be increased.

A first facing wall 31 is provided above the storage 8 and below the heating coil 5b, that is, between the partition 20 that defines the storage 8 and the heating coil 5b. The first facing wall 31 has a flat surface oriented substantially parallel to the top plate 2. In a state where the cooker 100 is seen in a direction perpendicular to the open face of the exhaust vent 3, that is, in plan view in Embodiment 1, at least part of the first facing wall 31 coincides with part of the exhaust vent 3.

Figure 4:
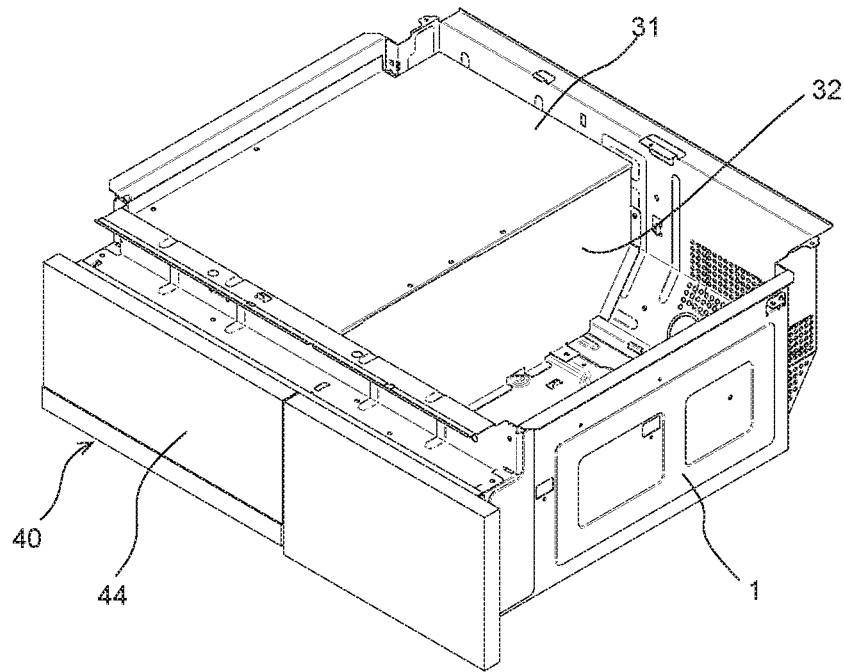
FIG. 4 is a perspective view of the cooker according to Embodiment 1, with a top plate, heaters, and a circuit board of the cooker removed.

FIG. 4 is a perspective view of the cooker according to Embodiment 1, with the top plate, the heaters, and the circuit board of the cooker removed. The first facing wall 31 and a second facing wall 32 are provided in the housing 1 and each face the partition 20 that defines the storage 8. The first facing wall 31 is oriented with the flat surface of the first facing wall 31 substantially paralleled to the top plate 2 (see FIG. 3). The second facing wall 32 is oriented with the flat surface of the second facing wall 32 substantially perpendicular to the first facing wall 31. The first facing wall 31 and the second facing wall 32 each extend from the front inner surface to the rear inner surface of the housing 1. The lengths of the first facing wall 31 and the second facing wall 32 in the direction from the front to the rear of the cooker 100 are each substantially the same as the inside length of the housing 1 in the direction from the front to the rear of the cooker 100. The left end of the first facing wall 31 is in contact with the left inner surface of the housing 1. The right end of the first facing wall 31 is connected to the upper end of the second facing wall 32. The lower end of the second facing wall 32 is in contact with the bottom surface of the housing 1. Hence, a space substantially airtightly enclosed by the first facing wall 31, the second facing wall 32, and the inner surface of the housing 1 is provided in the housing 1.

The first facing wall 31 and the second facing wall 32 are each made of a metal material. The first facing wall 31 can be made of a material chiefly containing iron, such as galvanized steel sheet. In such a case, high-frequency magnetic flux generated from the heating coil 5b provided above the first facing wall 31 is absorbed by the first facing wall 31. Consequently, the high-frequency magnetic flux can be prevented from reaching the partition 20 (see FIG. 3) provided inside the first facing wall 31 and the second facing wall 32. Alternatively, the first facing wall 31 may be made of nonmagnetic metal such as aluminum and copper. In such a case, even when the high-frequency magnetic flux generated from the heating coil 5b provided above the first facing wall 31 induces an eddy current in the first facing wall 31, the first facing wall 31 is less likely to be heated. Consequently, the rise of the temperature of the partition 20 that defines the storage 8 can be reduced.

Figure 5:
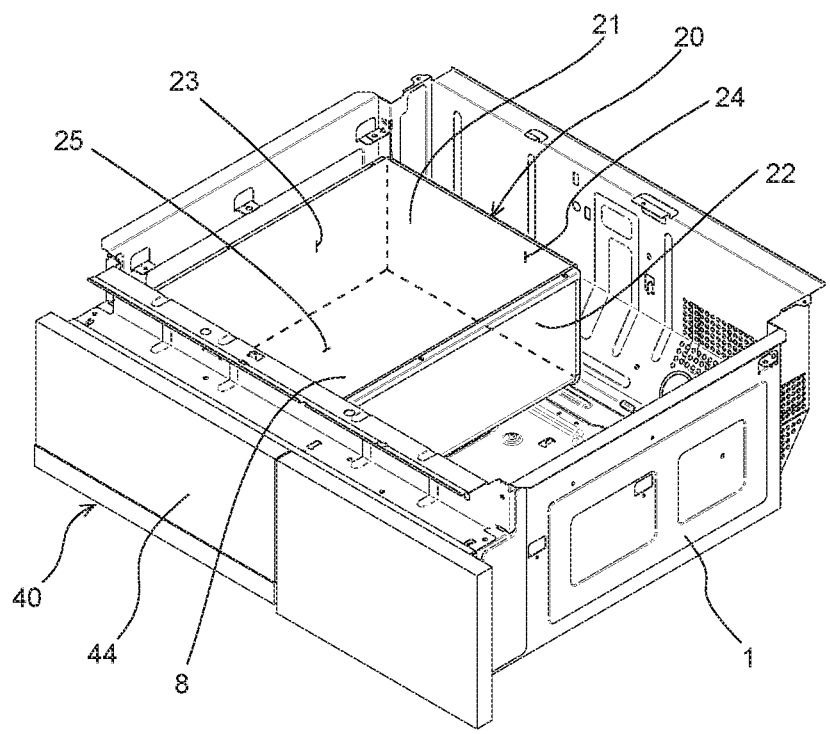
FIG. 5 is a perspective view of the cooker according to Embodiment 1, with the top plate, the heaters, the circuit board, and a first facing wall and a second facing wall of the cooker removed.

FIG. 5 is a perspective view of the cooker according to Embodiment 1, with the top plate, the heaters, the circuit board, and the first facing wall and the second facing wall of the cooker removed. The partition 20 that defines the storage 8 includes an upper wall 21 that is a first partition, a right wall 22 that is a second partition, a left wall 23, a rear wall 24, and a bottom board 25. The upper wall 21 has a flat surface that is parallel to the top plate 2 (see FIG. 3) and forms the ceiling of the storage 8. The right wall 22 has a flat surface that is substantially perpendicular to the upper wall 21 and is continuous with the right end of the upper wall 21. Unlike the first facing wall 31 and the second facing wall 32 illustrated in FIG. 4, the rear end of the partition 20 is not in contact with the rear inner surface of the housing 1, and a gap is defined between the rear inner surface of the housing 1 and the rear wall 24. Hence, in plan view, the upper wall 21 of the partition 20 is encompassed by the first facing wall 31 (see FIG. 4).

Figure 6:
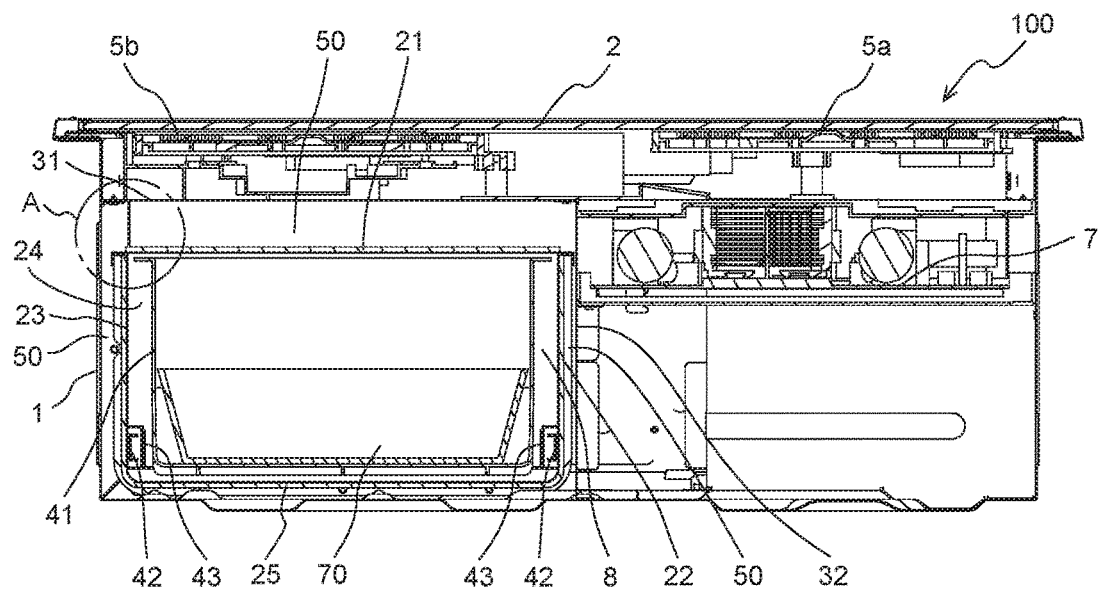
FIG. 6 is a lateral sectional view of the cooker according to Embodiment 1, passing through a storage and the heating coils.

FIG. 6 is a lateral sectional view of the cooker according to Embodiment 1, passing through the storage and the heating coils. The first facing wall 31 is provided below the heating coil 5b, and the upper wall 21 of the partition 20 is provided below the first facing wall 31. The upper wall 21 and the first facing wall 31 are positioned in such a manner that the flat surfaces of the upper wall 21 and the first facing wall 31 face each other with a gap defined between the upper wall 21 and the first facing wall 31. A heat-insulating layer 50 is provided in the gap between the upper wall 21 and the first facing wall 31. The heat-insulating layer 50 is made of a substance having a lower thermal conductivity than a thermal conductivity of the first facing wall 31. The right wall 22 of the storage 8 and the second facing wall 32 are positioned in such a manner that the flat surfaces of the right wall 22 of the storage 8 and the second facing wall 32 face each other with a gap defined between the right wall 22 of the storage 8 and the second facing wall 32. Another heat-insulating layer 50 is provided in the gap between the right wall 22 and the second facing wall 32. In Embodiment 1, a gap is defined between the left wall 23 of the storage 8 and the left sidewall of the housing 1, and yet another heat-insulating layer 50 is provided in the gap. As such gaps are each defined outside a corresponding one of the right wall 22 and the left wall 23, on which each of the fixed rails 42 are provided, vibration that may occur in the fixed rails 42 is less likely to be directly transmitted to the housing 1 and to the components provided in the housing 1. Consequently, deformation of the housing 1, displacement of any of the components in the housing 1, and other similar phenomena attributed to the vibration of the fixed rails 42 that may occur with pulling outward or pushing inward of the drawer unit 40 can be reduced.

Figure 7:
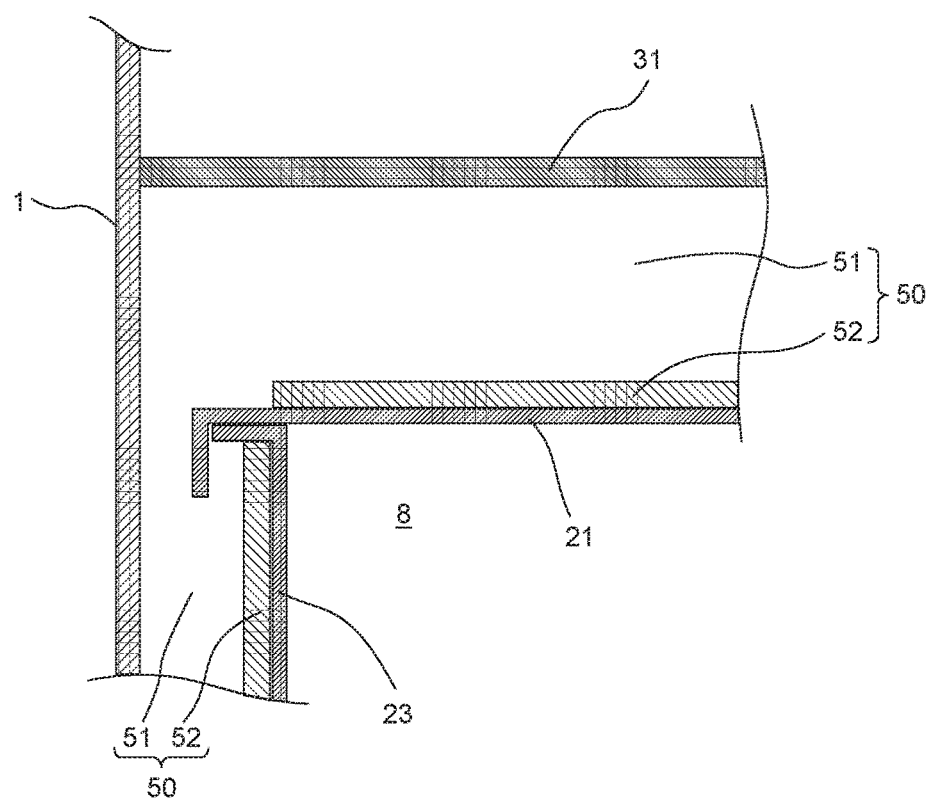
FIG. 7 is an enlarged view of a relevant part A of FIG. 6.

FIG. 7 is an enlarged view of a relevant part A of FIG. 6. The heat-insulating layer 50 provided between the first facing wall 31 and the upper wall 21 includes an air layer 51 and a heat-insulating material 52. The heat-insulating material 52 is laid over the outer surface (the upper surface) of the upper wall 21. The heat-insulating material 52 may be pasted to the upper wall 21 with adhesive. The air layer 51 and the heat-insulating material 52 are each a substance having a lower thermal conductivity than the thermal conductivity of the first facing wall 31. The heat-insulating material 52 may be, for example, a synthetic resin material, a rubber-based or urethane-based closed-cell foam material, glass fibers, ceramic fibers, or any other similar materials. As the heat-insulating layer 50 made of a material having lower thermal conductivity than the thermal conductivity of the first facing wall 31 is provided between the first facing wall 31 and the upper wall 21, the thermal resistance between the first facing wall 31 and the upper wall 21 can be increased. Hence, the heat conduction into the upper wall 21 defining the storage 8 can be reduced, and the rise of the temperature in the storage 8 can be reduced. As illustrated in FIG. 7, the heat-insulating layer 50 including the air layer 51 and the heat-insulating material 52 is also laid over the left wall 23 and provided between the left wall 23 defining the storage 8 and the housing 1.

While Embodiment 1 concerns an exemplary configuration in which the heat-insulating layers 50 each include both the air layer 51 and the heat-insulating material 52, the heat-insulating layers 50 may each include only one of the air layer 51 and the heat-insulating material 52. The material forming the heat-insulating material 52 is not limited to that described above and only needs to be a material having a lower thermal conductivity than the thermal conductivity of the first facing wall 31.

Figure 8:
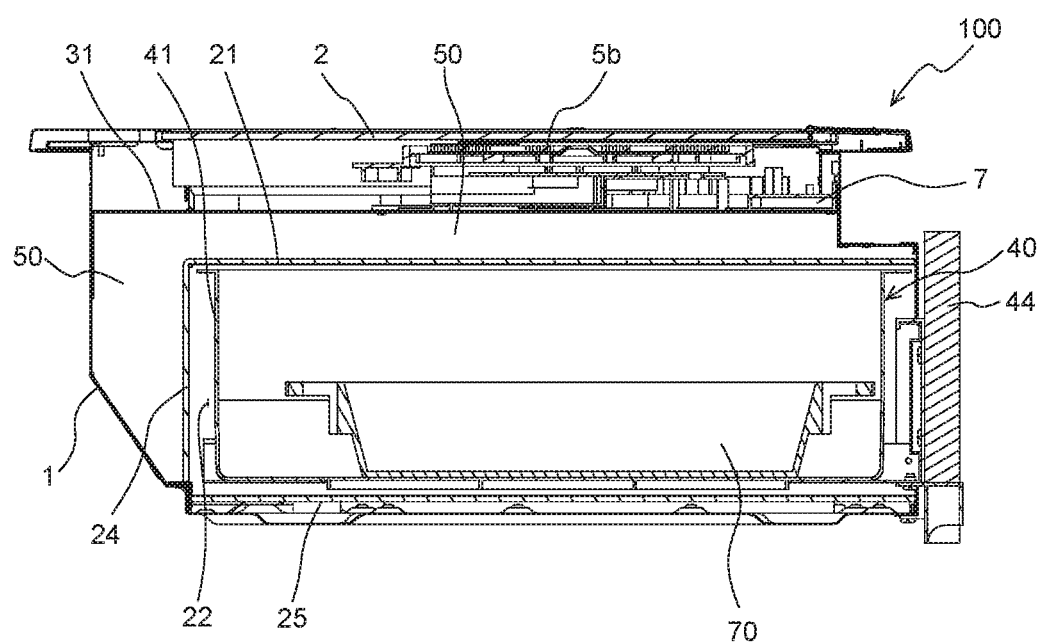
FIG. 8 is a sectional view of the cooker according to Embodiment 1, passing through the storage and the heating coil in a direction from the front to the rear of the cooker.

FIG. 8 is a sectional view of the cooker according to Embodiment 1, passing through the storage and the heating coil in a direction from the front to the rear of the cooker. As illustrated in FIG. 8, in addition to the heat-insulating layer 50 provided between the first facing wall 31 and the upper wall 21, another heat-insulating layer 50 is provided between the rear wall 24 and the rear inner surface of the housing 1. A heat-insulating material that is the same as the heat-insulating material 52 illustrated in FIG. 7 is provided on the outer surface of the rear wall 24.

As described above, according to Embodiment 1, the partition 20 that defines the storage 8 is provided in the housing 1 and below the heating coil 5b. Furthermore, the first facing wall 31 that faces the upper wall 21, which extends parallel to the top plate 2 and forms part of the partition 20, with a gap defined between the first facing wall 31 and the upper wall 21; and the second facing wall 32 that faces the right wall 22, which extends perpendicularly to the upper wall 21 that forms part of the partition 20, with a gap defined between the second facing wall 32 and the right wall 22 are provided. Furthermore, the heat-insulating layer 50 made of a material having a lower thermal conductivity than the thermal conductivity of the first facing wall 31 is provided between the upper wall 21 and the first facing wall 31 and the heat-insulating layer 50 made of a material having a lower thermal conductivity than a thermal conductivity of the second facing wall 32 is provided between the right wall 22 and the second facing wall 32. Consequently, the heat-insulating characteristic of the partition 20 defining the storage 8 against the heat generated by the heating coil 5b provided in the housing 1 is improved, and the rise of the temperature in the storage 8 can be reduced. Consequently, deterioration of the pieces of stuff in the storage 8 due to the heat can be reduced. Furthermore, the odd feeling and the uncomfortable feeling that may occur to the user because of the heat transmitted to the user when the drawer door 44 of the storage 8 is opened can be reduced.

In plan view, the upper wall 21 of the partition 20 defining the storage 8 is encompassed by the first facing wall 31. That is, the upper portion of the upper wall 21 of the partition 20 is covered by the first facing wall 31. Consequently, air heated by the heating coil 5b provided above the first facing wall 31 can be prevented from being in contact with the upper wall 21. Consequently, the rise of the temperature in the storage 8 can be reduced.

In a state where the cooker 100 is seen in the direction perpendicular to the open face of the exhaust vent 3, at least part of the first facing wall 31 coincides with part of the exhaust vent 3. Consequently, air in the housing 1 flows along the first facing wall 31, is guided to the exhaust vent 3, and is exhausted to the outside through the exhaust vent 3. As such an air-guiding structure is provided by the first facing wall 31, the air heated in the housing 1 is less likely to flow into the heat-insulating layers 50 through the gaps defined around the first facing wall 31 and the second facing wall 32. Consequently, the rise of the temperature in the storage 8 can be reduced.

At least part of the inner surface of the partition 20 defining the storage 8 may be made of a heat-insulating material having a lower thermal conductivity than a thermal conductivity of the partition 20. Such a heat-insulating material may be an insulating material such as resin. In such a case, the partition 20 itself may be made of an insulating material. Alternatively, a layer made of an insulating material may be provided over the inner surface of the partition 20 that is made of metal or any other similar material. When pieces of stuff are put into or brought out of the storage 8, the user may touch the inner surface of the partition 20. When the inner surface of the partition 20 is made of an insulating material having a low thermal conductivity, the temperature of the inner surface of the partition 20 is prevented from becoming higher than the body temperature. Consequently, the uncomfortable feeling and the odd feeling that may occur to the user because of heat can be reduced.

In Embodiment 1, air in the housing 1 is made to circulate with natural convection. Alternatively, an air-sending device that feeds cooling air may be provided in the housing 1. When an air-sending device is provided so that air suctioned from the outside of the housing 1 is made to circulate in the housing 1 and to be exhausted from the exhaust vent 3, the heat-generating components such as the heating coils 5a and 5b and the circuit board 7 can be cooled efficiently. In the configuration according to Embodiment 1, even when an air-sending device is provided and cooling air is forcibly produced in the housing 1, the rise of the temperature in the storage 8 with the airflow heated in the housing 1 can be reduced.

Embodiment 2

Embodiment 2 differs from Embodiment 1 in the configuration of the air passage provided in the housing 1. Embodiment 2 will be described below, focusing on the difference from Embodiment 1.

Figure 9:
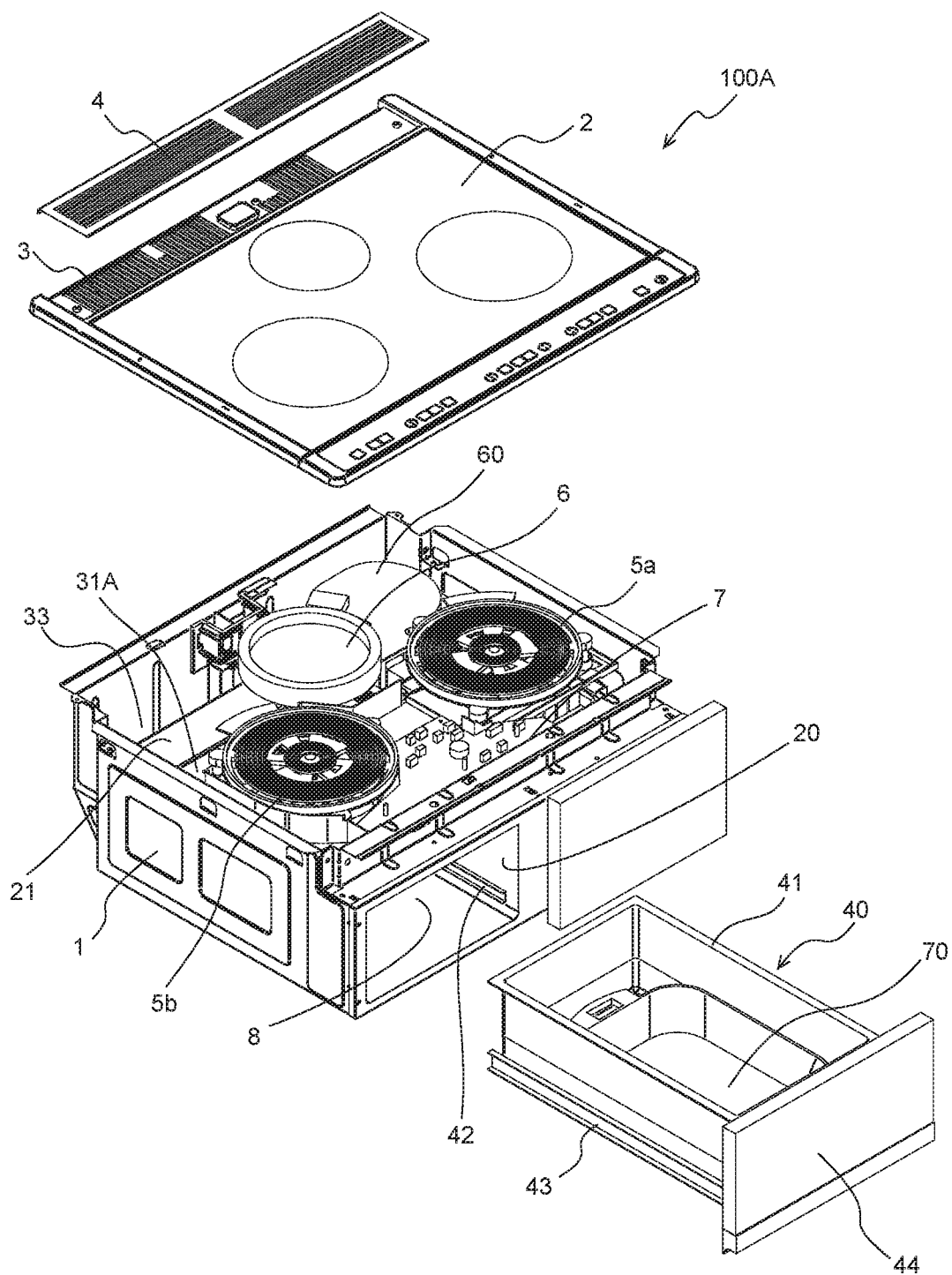
FIG. 9 is an exploded perspective view of a cooker according to Embodiment 2.

FIG. 9 is an exploded perspective view of a cooker according to Embodiment 2. A cooker 100A includes an air-sending device 60 provided in the housing 1 and behind the heating coil 5a. The length of a first facing wall 31A, in the direction from the front to the rear of the cooker 100A, provided below the heating coil 5b is shorter than the length of the first facing wall 31, in the direction from the front to the rear of the cooker 100, according to Embodiment 1, and a gap is defined between the rear end of the first facing wall 31A and the rear inner surface of the housing 1. This gap is denoted as a first opening 33. The first opening 33 allows the heat-insulating layer 50 provided between the first facing wall 31 and the upper wall 21 and an area above the first facing wall 31 to communicate with each other. In a state where the cooker 100A is seen in the direction perpendicular to the open face of the exhaust vent 3, at least part of the first opening 33 coincides with part of the exhaust vent 3. The first opening 33 is not limited to the one illustrated in the drawing. The first opening 33 may be provided by cutting off part of the first facing wall 31A.

Figure 10:
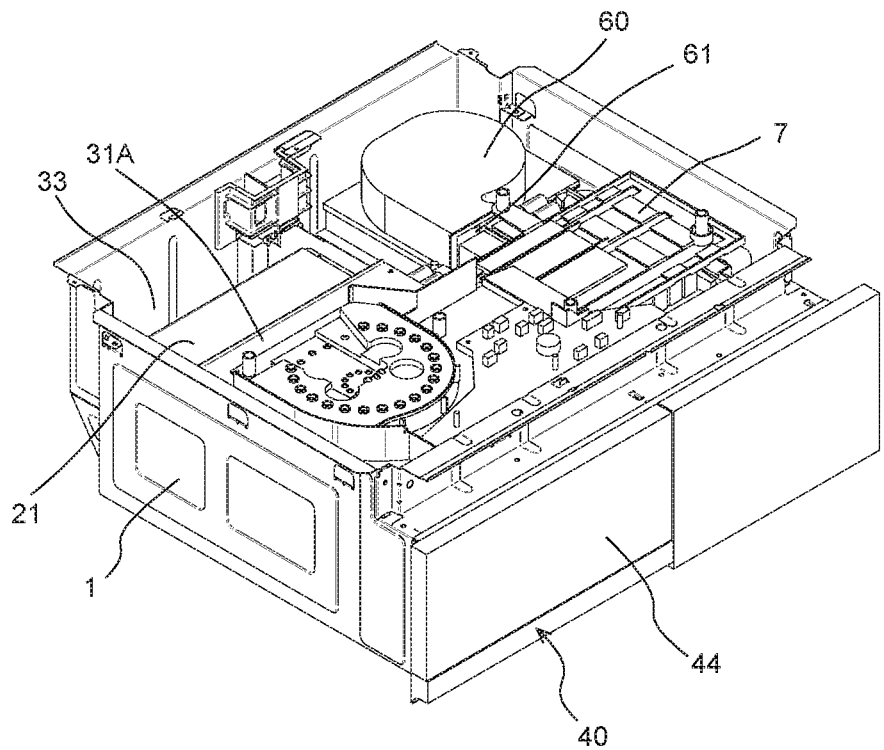
FIG. 10 is a perspective view of the cooker according to Embodiment 2, with a top plate and heaters of the cooker removed.

FIG. 10 is a perspective view of the cooker according to Embodiment 2, with the top plate and the heaters of the cooker removed. In Embodiment 2, the air-sending device 60 that feeds cooling air into the housing 1 is provided at the rear right in the housing 1. An air outlet 61 from which the cooling air sent from the air-sending device 60 is blown is open frontward. The circuit board 7 is provided downstream of the air outlet 61. When the air-sending device 60 is activated, the cooling air sent from the air-sending device 60 flows through the air outlet 61 and is blown to the circuit board 7, thereby cooling the components such as the inverter and a heat sink that are mounted on the circuit board 7. The cooling air sent from the air-sending device 60 flows through the housing 1 while spreading in the housing 1, thereby cooling the heating coils 5a and 5b (see FIG. 9) provided above the circuit board 7.

The upper wall 21 of the storage 8 is exposed from the first opening 33 provided between the rear end of the first facing wall 31A and the rear inner surface of the housing 1. That is, in Embodiment 2, part of the upper wall 21 is not covered by the first facing wall 31A, and, in plan view, the part of the upper wall 21 does not coincide with part of the first facing wall 31A.

Figure 11:
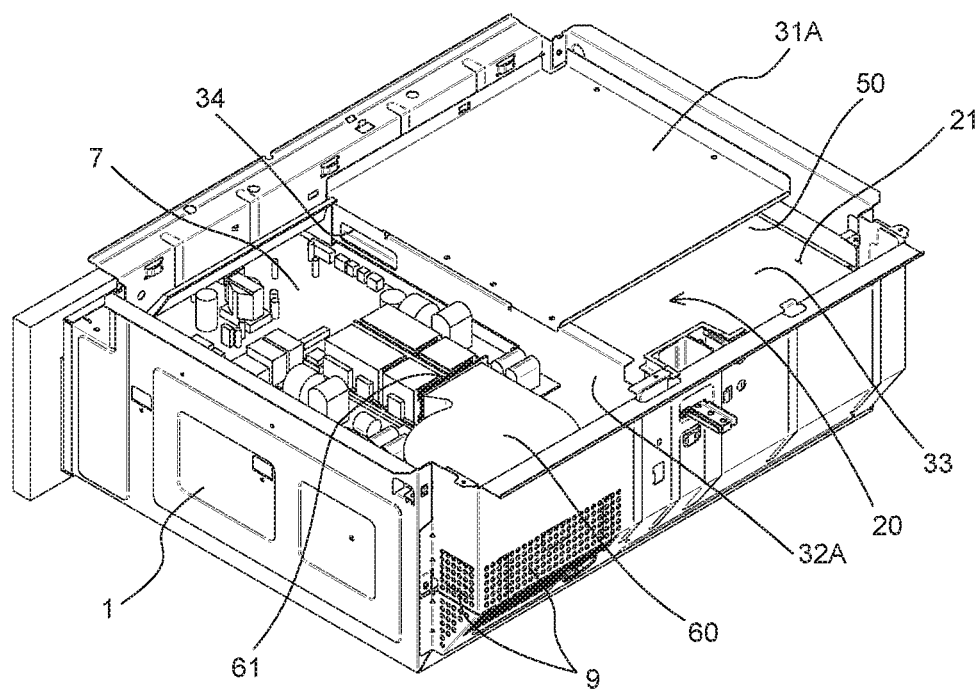
FIG. 11 is a rear perspective view of the cooker according to Embodiment 2, with a first facing wall exposed.

FIG. 11 is a rear perspective view of the cooker according to Embodiment 2, with the first facing wall exposed. The rear face of the housing 1 and a side face adjoining the rear face each have an intake vent 9. The air-sending device 60 according to Embodiment 2 has an air inlet (not illustrated) that is open downward. The intake vents 9 of the housing 1 each communicate with the air inlet of the air-sending device 60. Although not illustrated, an air passage that substantially airtightly connects the intake vents 9 and the air inlet of the air-sending device 60 to each other is provided in the housing 1.

As with the case of Embodiment 1, a second facing wall 32A extends from the front inner surface to the rear inner surface of the housing 1. Unlike the case of Embodiment 1, the second facing wall 32A has a second opening 34. The second opening 34 is provided closer to the front of the housing 1 than is the center of the housing 1 in the direction from the front to the rear of the housing 1. The second opening 34 communicates with a space to which air is blown from the air outlet 61 of the air-sending device 60. As with the case of Embodiment 1, a heat-insulating layer 50 (see FIG. 7) including an air layer 51 is provided between the first facing wall 31 and the partition 20 and another heat-insulating layer 50 including an air layer 51 is provided between the second facing wall 32A and the partition 20. When the air-sending device 60 is activated, cooling air blown from the air-sending device 60 flows through the second opening 34 into the gap between the second facing wall 32A and the partition 20, that is, into the heat-insulating layer 50. Thus, an air passage that allows the air outlet 61 of the air-sending device 60 and the heat-insulating layer 50 to communicate with each other is provided in the housing 1.

Figure 12:
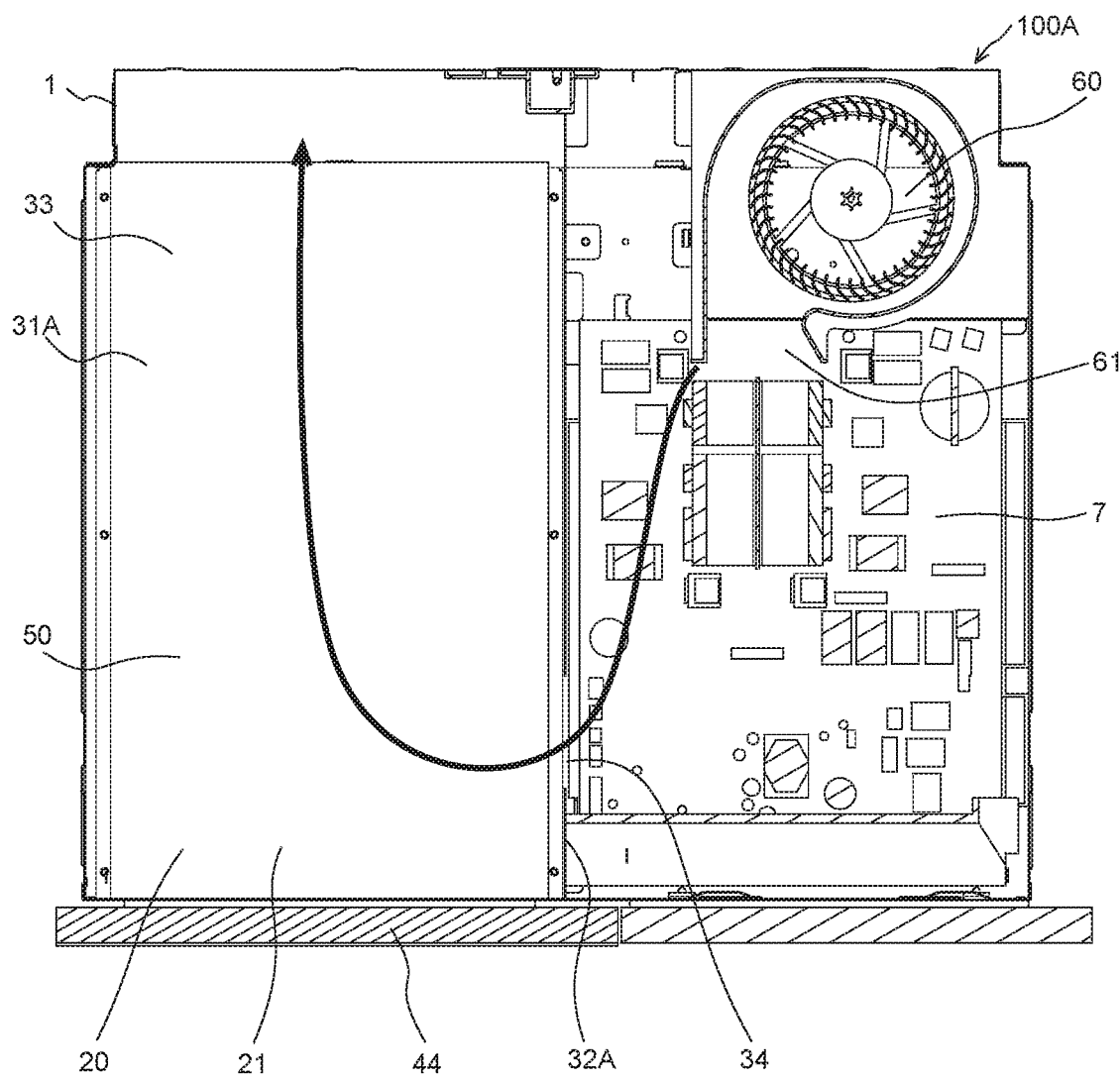
FIG. 12 is a diagram illustrating a flow of cooling air in the cooker according to Embodiment 2.

FIG. 12 is a diagram illustrating a flow of cooling air in the cooker according to Embodiment 2. FIG. 12 illustrates a horizontal section passing through the heat-insulating layer above the upper wall 21 and conceptually represents, with an arrow, the cooling air blown from the air-sending device 60 and flowing through the second opening 34. The cooling air blown from the air outlet 61 of the air-sending device 60 flows around the circuit board 7, through the second opening 34, and into the heat-insulating layers 50 inside the second facing wall 32A. The cooling air thus having flowed into the heat-insulating layers 50 flows toward the rear of the housing 1, where the exhaust vent 3 (see FIG. 9) is provided. As air flows through the heat-insulating layers 50 as described above, the heat is exhausted from the exhaust vent 3, and the heat can be thus prevented from being trapped in the heat-insulating layers 50. That is, an advantageous effect of reducing the rise of the temperature in the storage 8 defined by the partition 20 is produced.

The second opening 34 serving as an inlet for the cooling air flowing into the heat-insulating layers 50 is provided at a position in the vicinity of the front of the housing 1. The first opening 33 serving as an outlet for the cooling air flowing from the heat-insulating layers 50 is provided at a position in the vicinity of the rear of the housing 1. As the second opening 34 and the first opening 33 are provided apart from each other, the re-entry of the cooling air flowing out of the first opening 33 into the heat-insulating layers 50 through the second opening 34 can be reduced. Consequently, the reduction in the cooling efficiency in the housing 1 can be reduced.

Figure 13:
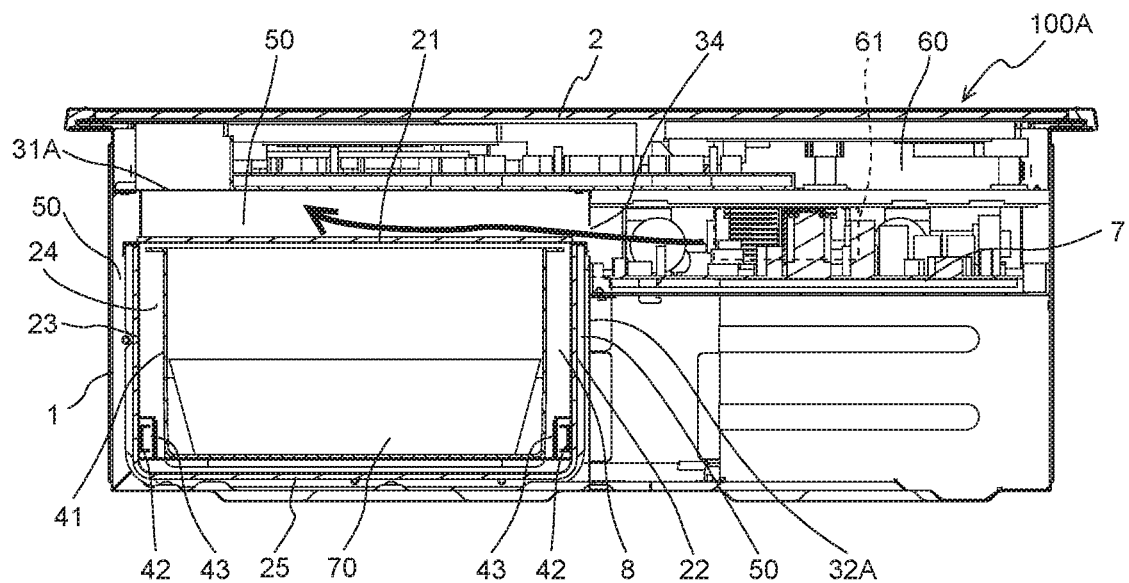
FIG. 13 is a diagram illustrating a flow of cooling air in the cooker according to Embodiment 2.

FIG. 13 is a diagram illustrating a flow of cooling air in the cooker according to Embodiment 2. FIG. 13 illustrates a lateral section passing through the second opening 34 of the second facing wall 32A and conceptually represents, with an arrow, cooling air blown from the air-sending device 60 and flowing through the second opening 34. The cooling air blown from the air-sending device 60 flows through the second opening 34 into the heat-insulating layer 50 provided between the upper wall 21 of the storage 8 and the first facing wall 31A. The second opening 34 provided in the second facing wall 32A is positioned below the flat surface of the first facing wall 31A, that is, below the surface supporting the heating coils 5a and 5b. Consequently, the cooling air flowing from the second opening 34 into the heat-insulating layers 50 is less susceptible to the heat generated from the heating coils 5a and 5b, and the rise of the temperature of such cooling air is reduced. Hence, cooling air of a lower temperature can be fed to the heat-insulating layers 50. Consequently, the temperature in the storage 8 can be lowered.

The opening area of the air outlet 61 of the air-sending device 60 and the opening area of the second opening 34 provided in the second facing wall 32A coincide with each other at least partially in the height direction. Consequently, compared with a case where the positional difference in the height direction between the air outlet 61 and the second opening 34 is large, the probability of direct entry of the cooling air blown from the air outlet 61 into the second opening 34 can be increased. Hence, the rise of the temperature of the cooling air due to the heat generated from the heat-generating components mounted on the circuit board 7 can be reduced. Consequently, cooling air of a lower temperature can be fed to the heat-insulating layers 50.

Figure 14:
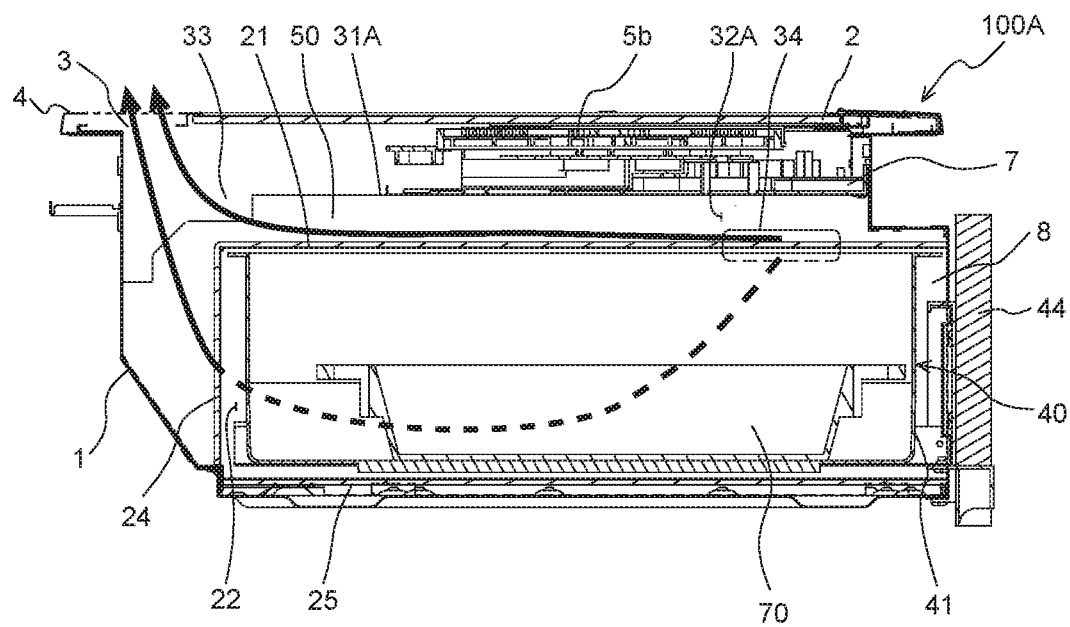
FIG. 14 is a diagram illustrating flows of cooling air in the cooker according to Embodiment 2.

FIG. 14 is a diagram illustrating flows of cooling air in the cooker according to Embodiment 2. FIG. 14 illustrates a section passing through the storage 8 in a direction from the front to the rear of the cooker 100A and conceptually represents, with arrows, cooling air flowing from the second opening 34 to the exhaust vent 3. The second opening 34 extends from the upper portion to the lower portion of the upper wall 21 of the storage 8. Cooling air that has flowed into the heat-insulating layer 50 from the upper portion of the second opening 34 that is higher than the upper wall 21 flows along the upper surface of the upper wall 21 and between the upper wall 21 and the first facing wall 31A toward the rear of the housing 1. Then, the cooling air flows through the first opening 33 and is exhausted from the exhaust vent 3. Cooling air that has flowed into the heat-insulating layer 50 from the lower portion of the second opening 34 that is lower than the upper wall 21 flows between the right wall 22 and the second facing wall 32A toward the rear of the housing 1. Then, the cooling air flows through the first opening 33 and is exhausted from the exhaust vent 3. With the second opening 34 extending from the upper portion to the lower portion of the upper wall 21, the airflow along the upper wall 21 of the storage 8 and the airflow along the right wall 22 are both easily produced. Consequently, with the aid of both the upper wall 21 and the right wall 22, the temperature in the storage 8 can be lowered.

As described above, the cooker 100A according to Embodiment 2 includes the air passage that allows the air outlet 61 of the air-sending device 60 and the heat-insulating layers 50 to communicate with each other. Consequently, the exhaustion of the heat from the heat-insulating layer 50 provided between the partition 20 defining the storage 8 and each of the first facing wall 31A and a second facing wall 32A can be promoted. Consequently, the rise of the temperature in the storage 8 can be reduced.

Embodiment 3

Embodiment 3 differs from Embodiment 2 in the configuration of the air passage provided in the housing 1.

Embodiment 3 will be described below, focusing on the difference from Embodiment 2.

Figure 15:
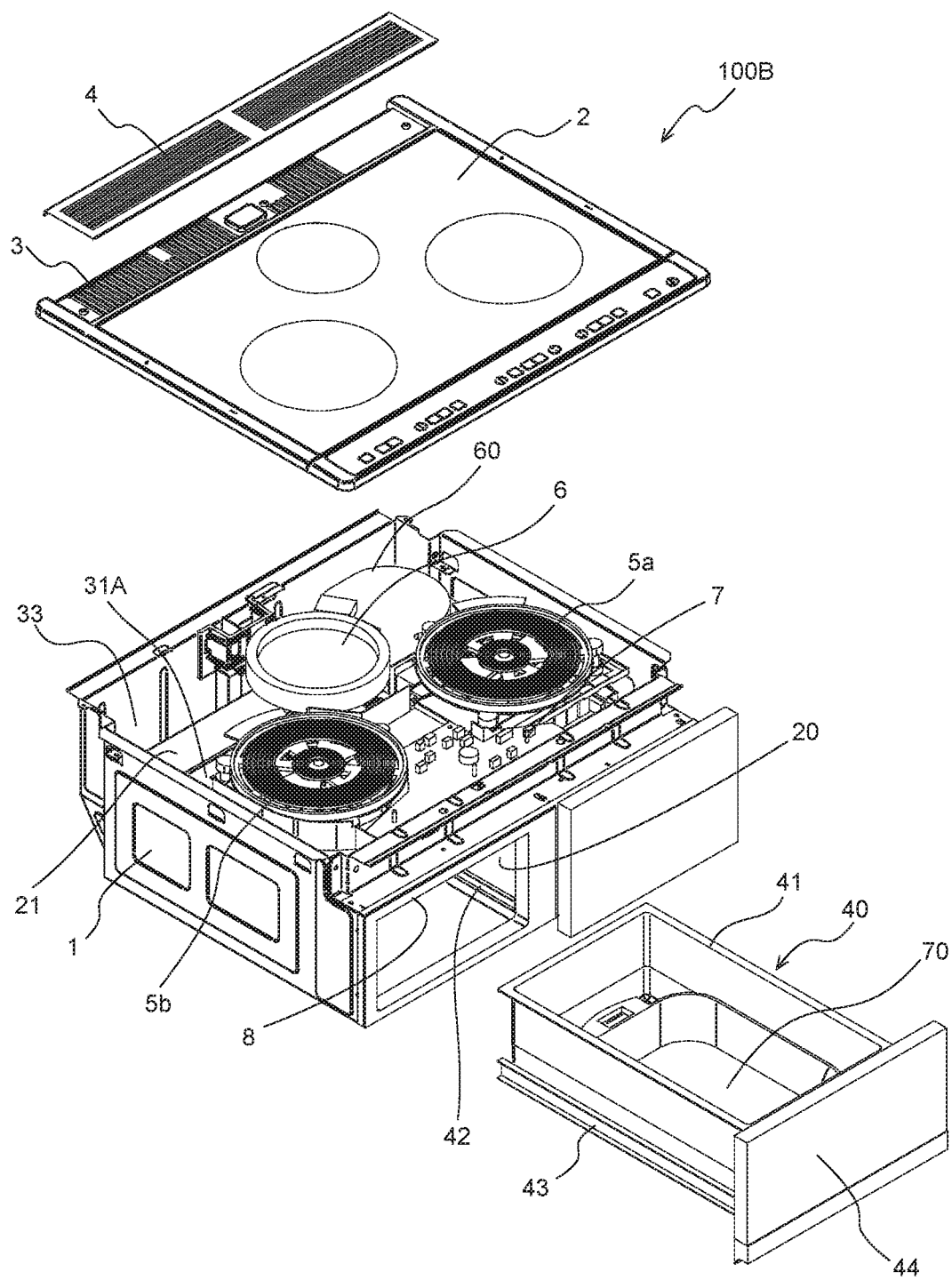
FIG. 15 is an exploded perspective view of a cooker according to Embodiment 3.

FIG. 15 is an exploded perspective view of a cooker according to Embodiment 3. The configuration of a cooker 100B according to Embodiment 3 illustrated in FIG. 15 is the same as that of the cooker 100A according to Embodiment 2 illustrated in FIG. 9.

Figure 16:
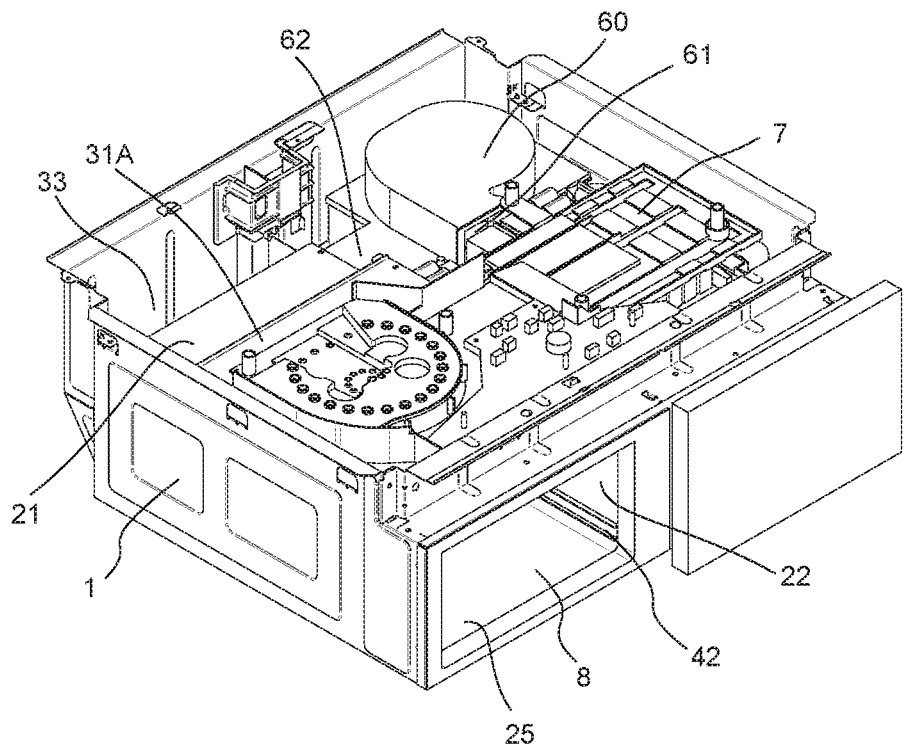
FIG. 16 is a perspective view of the cooker according to Embodiment 3, with a top plate and heaters of the cooker removed.
Figure 17:
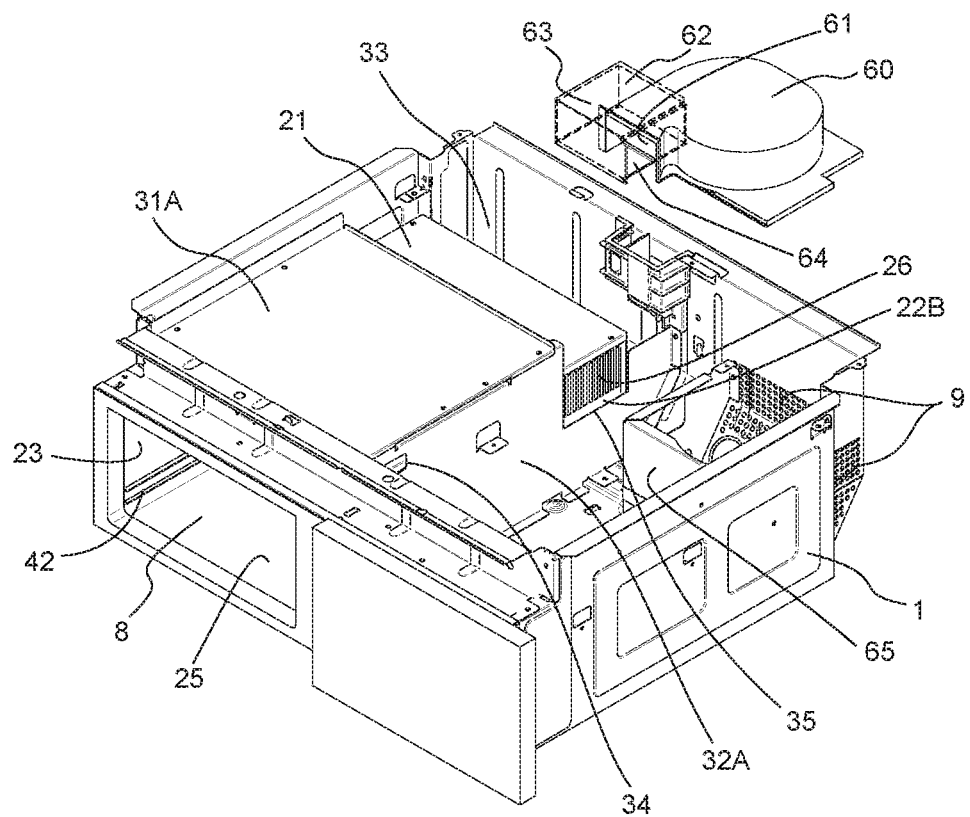
FIG. 17 is a diagram illustrating a configuration of an air passage provided in the cooker according to Embodiment 3.

FIG. 16 is a perspective view of the cooker according to Embodiment 3, with a top plate and heaters of the cooker removed. FIG. 17 is a diagram illustrating a configuration of an air passage provided in the cooker according to Embodiment 3. FIG. 17 illustrates a state where the air-sending device 60 and a connecting duct 62 are removed from the housing 1 of the cooker 100B. As illustrated in FIGS. 16 and 17, the air-sending device 60 is provided with the connecting duct 62 connected to the air-sending device 60. The connecting duct 62 has an air passage, in the connecting duct 62, with an inlet 63 and an outlet 64. The outlet 64 of the connecting duct 62 communicates with the air inlet of the air-sending device 60.

An intake duct 65 is provided in the housing 1 and below the air-sending device 60. The intake duct 65 has, in the intake duct 65, an air passage that allows the intake vents 9 provided in the housing 1 and the air inlet of the air-sending device 60 to communicate with each other. The intake duct 65 substantially airtightly connects the intake vents 9 and the air inlet provided in the lower surface of the air-sending device 60 to each other.

A right wall 22B of the storage 8 has an opening 26 that allows the inside and the outside of the storage 8 to communicate with each other. The opening 26 according to Embodiment 3 includes a plurality of vertically long slits and is provided at a position in the vicinity of the rear of the right wall 22B. The second facing wall 32A has a cut 35 at a position facing the opening 26 of the right wall 22B. Consequently, the outer portion of the opening 26 of the right wall 22B is not covered by the second facing wall 32A. The specific shape of the opening 26 is not limited to the one illustrated in the drawing.

In the state where the connecting duct 62 and the air-sending device 60 are mounted to the housing 1, the inlet 63 of the connecting duct 62 is substantially airtightly connected to the opening 26 provided in the right wall 22 of the storage 8. The outlet 64 of the connecting duct 62 is connected to the air inlet of the air-sending device 60.

Figure 18:
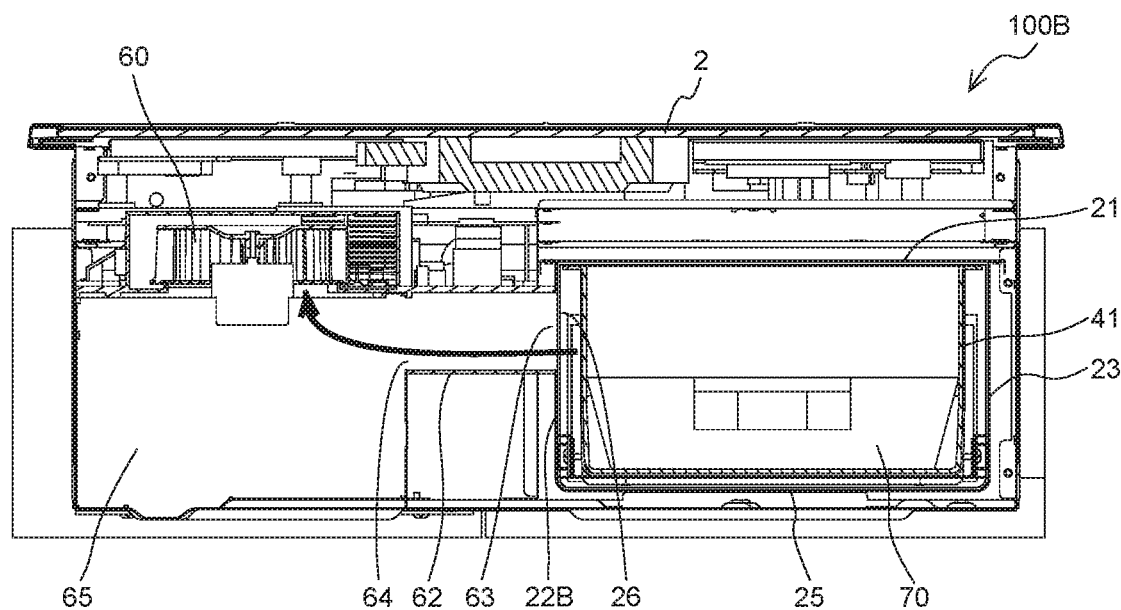
FIG. 18 is a diagram illustrating a flow of cooling air in the cooker according to Embodiment 3.

FIG. 18 is a diagram illustrating a flow of cooling air in the cooker according to Embodiment 3. FIG. 18 illustrates a lateral section passing through the air-sending device 60 in a state where the cooker 100B is seen from the rear of the cooker 100B, and conceptually represents, with an arrow, cooling air flowing through the connecting duct 62. As illustrated in FIG. 18, the connecting duct 62 according to Embodiment 3 has, in the connecting duct 62, a linear air passage extending laterally. Consequently, the pressure loss of the cooling air flowing from the opening 26 provided in the right wall 22B to the air inlet of the air-sending device 60 can be reduced.

Figure 19:
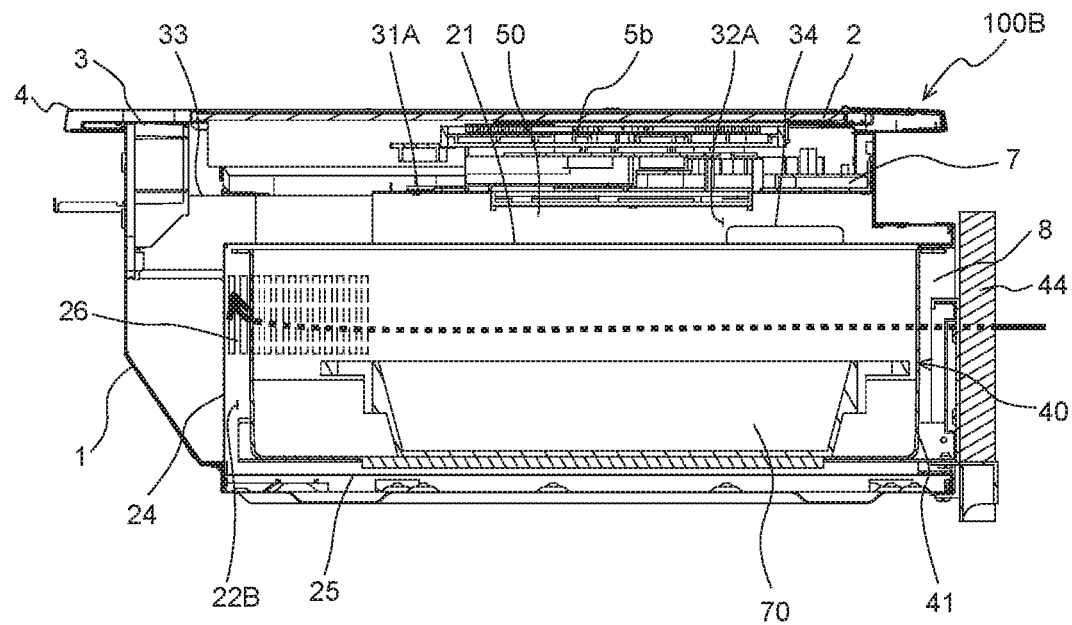
FIG. 19 is a diagram illustrating a flow of cooling air in the cooker according to Embodiment 3.

FIG. 19 is a diagram illustrating a flow of cooling air in the cooker according to Embodiment 3. FIG. 19 illustrates a section passing through the storage 8 in a direction from the front to the rear of the cooker 100B and conceptually represents, with an arrow, cooling air flowing through the opening 26 of the right wall 22B. With reference to FIGS. 17 to 19, an effect produced by the cooling air generated by the activation of the air-sending device 60 will be described below. When the air-sending device 60 is activated, air outside the housing 1 is suctioned into the intake duct 65 through the intake vents 9. The air thus suctioned into the intake duct 65 is then suctioned into the air inlet of the air-sending device 60 (see FIG. 17).

A suction force generated at the air inlet of the air-sending device 60 generates suction forces at the inlet 63 of the connecting duct 62 connected to the air inlet of the air-sending device 60 and at the opening 26 of the right wall 22B. Consequently, air outside the storage 8 is suctioned into the storage 8. More specifically, a gap through which air is allowed to pass is defined around the drawer door 44 that opens and closes the open part provided at the front face of the storage 8. When a suction force is generated at the opening 26, air outside the housing 1 flows into the storage 8 through the gap around the drawer door 44 as illustrated in FIG. 19. The air thus having flowed into the storage 8 flows inside the storage 8 toward the rear of the storage 8 and is discharged to the outside of the storage 8 through the opening 26. As illustrated in FIG. 18, the cooling air thus discharged from the storage 8 then flows into the connecting duct 62 from the inlet 63 of the connecting duct 62 connected to the opening 26, and is suctioned into the air inlet of the air-sending device 60 through the outlet 64. The air having flowed from the intake vents 9 of the housing 1 and the air having flowed through the storage 8 and the connecting duct 62 merge together at the air inlet of the air-sending device 60, and the merged air is blown as cooling air from the air-sending device 60.

The cooker 100B according to Embodiment 3 has the air passage that allows air outside the housing 1 to flow through the storage 8. As air outside the housing 1 flows through the storage 8, the heat inside the storage 8 is removed and becomes less likely to be trapped in the storage 8. Thus, an advantageous effect of reducing the rise of the temperature in the storage 8 is produced. Furthermore, the cooling air flowing through the storage 8 reduces the stagnation of air in the storage 8, and local rise of the temperature can be thus reduced. The opening 26 of the right wall 22 is preferably provided at a position away from the drawer door 44 serving as the inlet for the air flowing into the storage 8, or more specifically at a position closer to the rear of the storage 8 than is the center of the storage 8 in the direction from the front to the rear of the storage 8, or more preferably at a position close to the rear wall 24. Thus, the path of the cooling air flowing in the storage 8 can be made longer. Consequently, the effect of reducing the stagnation of air in the storage 8 can be increased.

The cooker 100B according to Embodiment 3 has the first opening 33 and the second opening 34. Consequently, cooling air fed from the air-sending device 60 flows through the heat-insulating layers 50 provided inside the first facing wall 31A and the second facing wall 32A (see FIGS. 12 to 14). Hence, the same advantageous effect as that produced in Embodiment 2 can be produced.

Embodiment 3 concerns, in addition to a configuration of generating cooling air in the heat-insulating layers 50 described in Embodiment 2, a configuration of providing an air passage passing through the storage 8. The configuration of generating cooling air in the heat-insulating layers 50 that has been described in Embodiment 2 may be omitted. For example, when the heat-insulating layers 50 each only include the heat-insulating material 52 with no air layer 51, the first opening 33 and the second opening 34 are not necessary.

The invention claimed is:

1. A cooker, comprising:
   a heating coil;
   a housing accommodating the heating coil;
   a top plate provided on the housing;
   a partition defining a storage in the housing and below the heating coil and including a first part of the partition extending parallel to the top plate and a second part of the partition extending perpendicularly to the first part of the partition;
   a first facing wall facing the first part of the partition with a gap defined between the first facing wall and the first part of the partition;
   a second facing wall facing the second part of the partition with a gap defined between the second facing wall and the second part of the partition;
   a heat-insulating layer provided between the first part of the partition and the first facing wall; and
   a heat-insulating layer provided between the second part of the partition and the second facing wall, wherein
   the heat-insulating layers each have a lower thermal conductivity than a thermal conductivity of a corresponding one of the first facing wall and the second facing wall,
   the housing or the top plate has an exhaust vent communicating with an inside of the housing,
   in a state where the cooker is seen in a direction perpendicular to an open face of the exhaust vent, at least part of the first facing wall is overlapped by at least part of the exhaust vent, and
   the first facing wall is configured to guide air in the housing to the exhaust vent.

2. The cooker of claim 1, wherein, in a plan view, the first part of the partition is encompassed by the first facing wall.

3. The cooker of claim 1, wherein at least one of the heat-insulating layers includes an air layer.

4. The cooker of claim 3, further comprising an air-sending device provided in the housing, wherein an air passage allowing an air outlet of the air-sending device and at least one of the heat-insulating layers to communicate with each other is provided.

5. The cooker of claim 4,
   wherein a first opening allowing the gap between the first facing wall and the first part of the partition and an area above the first facing wall to communicate with each other is provided, and
   wherein a second opening allowing the gap between the second facing wall and the second part of the partition and the air outlet of the air-sending device to communicate with each other is provided.

6. The cooker of claim 4,
   wherein the partition has an opening communicating with an inside of the storage, and
   wherein the cooker includes a connecting duct connecting an air inlet of the air-sending device and the opening provided at the partition to each other.

7. The cooker of claim 6, further comprising a door configured to open and close an open part provided at a front face of the storage, wherein the opening provided at the partition is positioned closer to a rear of the storage than is a center of the storage in a direction from a front to the rear of the storage.

8. The cooker of claim 1, further comprising an air-sending device provided in the housing,
   wherein the partition has an opening communicating with an inside of the storage, and
   wherein the cooker includes a connecting duct connecting the opening provided at the partition and an air inlet of the air-sending device to each other.

9. The cooker of claim 8, further comprising a door configured to open and close an open part provided at a front face of the storage, wherein the opening provided at the partition is positioned closer to a rear of the storage than is a center of the storage in a direction from a front to the rear of the storage.

10. The cooker of claim 1, wherein at least one of the heat-insulating layers includes a heat-insulating material having a lower thermal conductivity than a thermal conductivity of a corresponding one of the first facing wall and the second facing wall, and wherein the heat-insulating material is laid over a corresponding one of the first part of the partition and the second part of the partition.

11. The cooker of claim 1,
    wherein the first facing wall is made of metal, and
    wherein the heating coil is positioned above the first facing wall.

12. The cooker of claim 11, wherein the first facing wall is made of nonmagnetic metal.

13. The cooker of claim 1, wherein at least part of an inner surface of the partition is provided with a heat-insulating material that has a lower thermal conductivity than a thermal conductivity of the partition.

14. The cooker of claim 1, further comprising a cooking pan to be heated by the heating coil, the cooking pan being stored in the storage.

\* \* \* \* \*